US008442502B2

(12) United States Patent
Leung

(10) Patent No.: US 8,442,502 B2
(45) Date of Patent: May 14, 2013

(54) TRACKING AN OBJECT IN AUGMENTED REALITY

(75) Inventor: Henry Leung, Calgary (CA)

(73) Assignee: Empire Technology Development, LLC, Wilmington, DE (US)

( * ) Notice: Subject to any disclaimer, the term of this patent is extended or adjusted under 35 U.S.C. 154(b) by 381 days.

(21) Appl. No.: 12/715,868

(22) Filed: Mar. 2, 2010

(65) Prior Publication Data
US 2011/0217962 A1    Sep. 8, 2011

(51) Int. Cl.
H04M 3/42    (2006.01)

(52) U.S. Cl.
USPC ............... 455/414.2; 455/404.2; 455/456.1; 455/506

(58) Field of Classification Search ............... 455/414.2, 455/404.2, 456.1–457, 506
See application file for complete search history.

(56) References Cited

U.S. PATENT DOCUMENTS

| | | | |
|---|---|---|---|
| 5,604,503 A * | 2/1997 | Fowler et al. ................. | 342/378 |
| 6,011,515 A * | 1/2000 | Radcliffe et al. ............. | 342/453 |
| 8,180,396 B2 * | 5/2012 | Athsani et al. ................ | 455/557 |
| 2004/0246177 A1 * | 12/2004 | Lloyd et al. .................... | 342/453 |
| 2005/0200453 A1 * | 9/2005 | Turner et al. ................. | 340/5.61 |
| 2010/0309040 A1 * | 12/2010 | Rofougaran et al. ......... | 342/104 |
| 2010/0328344 A1 * | 12/2010 | Mattila et al. ................. | 345/633 |

OTHER PUBLICATIONS

Azuma, et al.; (2001) "Recent Advances in Augmented Reality"; IEEE Computer Graphics and Application, vol. 21, No. 6, pp. 1-15.
Griffiths et al.; (2005) "Passive Coherent Location Radar Systems. Part 1: Performance Prediction"; IEE Proc. Radar, Sonar, Navig., vol. 152, No. 3 pp. 153-159.
Tan et al. (2003) "Feasibility analysis of GSM signal for passive radar"; Proc of 2003 IEEE Radar Conf., pp. 425-430.
Randerson, J., "Cellphone 'radar' tracks traffic flow," Oct. 27, 2003, http://www.newscientist.com/article/dn4299-cellphone-radar-tracks-trafficflow.html.
Chryssomallis, M., "Smart Antennas", IEEE Antennas and Propagation Magazine, vol. 42, No. 3, pp. 129-136, Jun. 2000.
PCT International Search Report PCT/ISA/220, Date of Mailing: Mar. 30, 2011.
PCT Written Opinion of the International Searching Authority PCT/ISA/237, Date of Mailing: Mar. 30, 2011.
Ellinger et al. (Nov. 2007) "Local Positioning for Wireless Sensor Networks"; IEEE Globecom Workshop 2007, p. 1-6.

(Continued)

*Primary Examiner* — Jinsong Hu
*Assistant Examiner* — Michael Nguyen
(74) *Attorney, Agent, or Firm* — Steven S. Rubin, Esq.; Moritt Hock & Hamroff LLP

(57) ABSTRACT

Technologies are generally described for tracking an object. In some examples, a system may comprise a mobile phone and an augmented reality device. The mobile phone may be effective to receive a transmitted wave and to receive a reflected wave reflected off of an object. The mobile phone may be configured to determine a difference between the transmitted and the reflected wave, and generate first tracking data based on the determined difference. The augmented reality device may be adapted to receive the first tracking data and determine second tracking data regarding the location of the object based on the first tracking data. An image may be generated on a display based on the determined first and second tracking data.

34 Claims, 5 Drawing Sheets

OTHER PUBLICATIONS

Wagner et al. (May/Jun. 2009) "Making Augmented Reality Practical on Mobile Phones, Part 1"; IEEE Computer Graphics and Applications; 29(3) p. 12-15.

Wagner et al. (Jul./Aug. 2009) "Making Augmented Reality Practical on Mobile Phones, Part 2"; IEEE Computer Graphics and Applications; p. 6-9.

* cited by examiner

300 A computer program product.
302 A signal bearing medium.

304
At least one of
One or more instructions for receiving a transmitted wave with an antenna in the mobile phone; or
One or more instructions for receiving a reflected wave with the antenna, wherein the reflected wave is associated with energy reflected from the object when illuminated with the transmitted wave; or
One or more instructions for determining a difference between the transmitted wave and the reflected wave by a processor in communication with the antenna; or
One or more instructions for generating tracking data by the processor based on the difference, the tracking data being associated with the location of the real object in the scene of interest; or
One or more instructions for combining the tracking data with additional data regarding the scene of interest to generate combined data, wherein the combined data represents the location of the real object within the augmented reality system.

| 306 A computer readable medium | 308 A recordable medium | 310 A communications medium |

Fig. 4

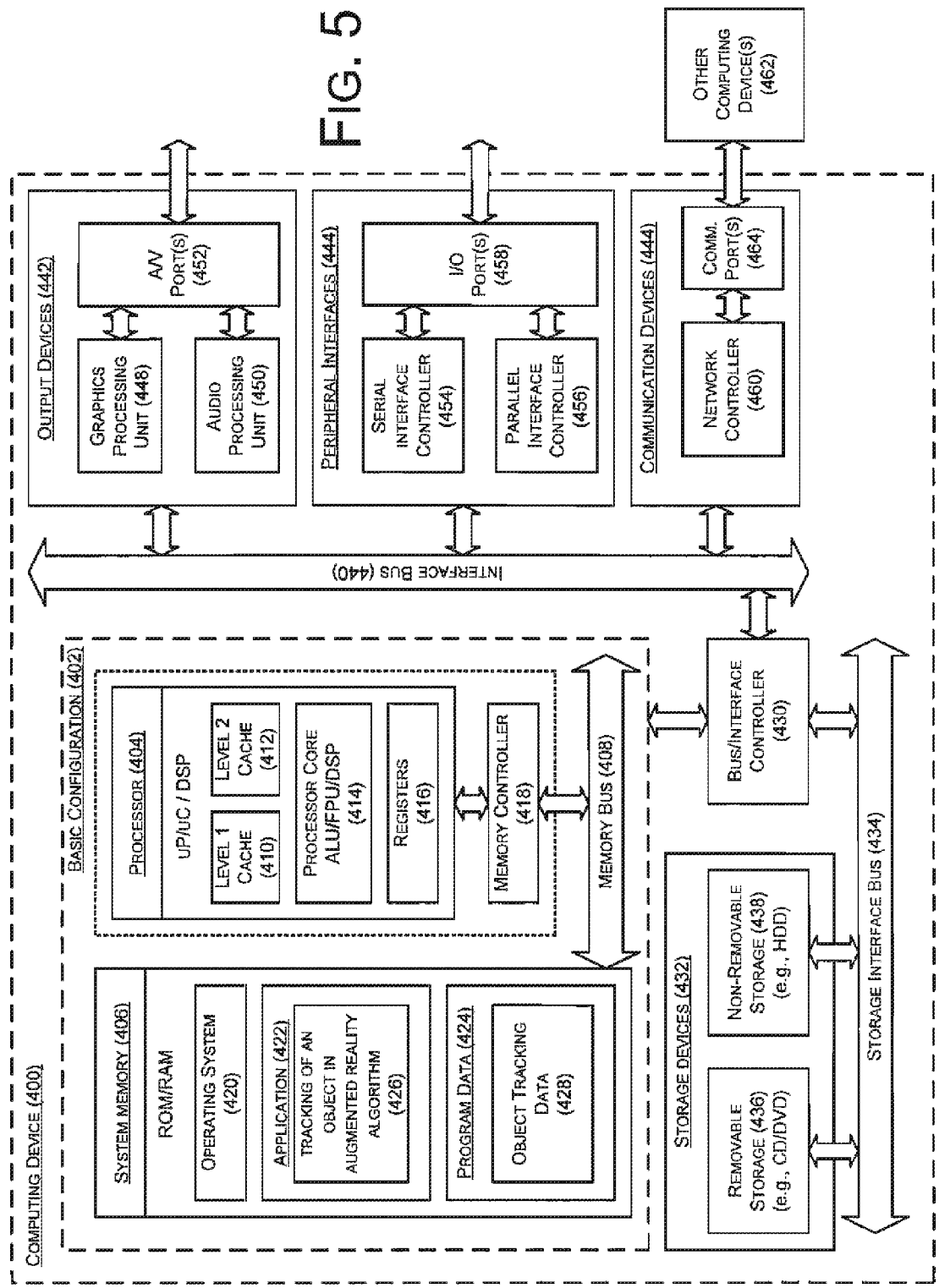

TRACKING AN OBJECT IN AUGMENTED REALITY

BACKGROUND

Unless otherwise indicated herein, the materials described in this section are not prior art to the claims in this application and are not admitted to be prior art by inclusion in this section.

In an augmented reality system, a user's view of the real world is enhanced or augmented with additional information generated by a computing device. Through a display provided to the user, the user may see virtual geometric objects placed onto real objects in a scene of interest. Additionally, non-geometric virtual information may be added about real objects and displayed on the display.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates computer program products for tracking of an object in augmented reality; and FIG. 5 is a block diagram illustrating an example computing device 400 that is arranged to perform tracking of an object in augmented reality in accordance with the present disclosure;

Figure 1:
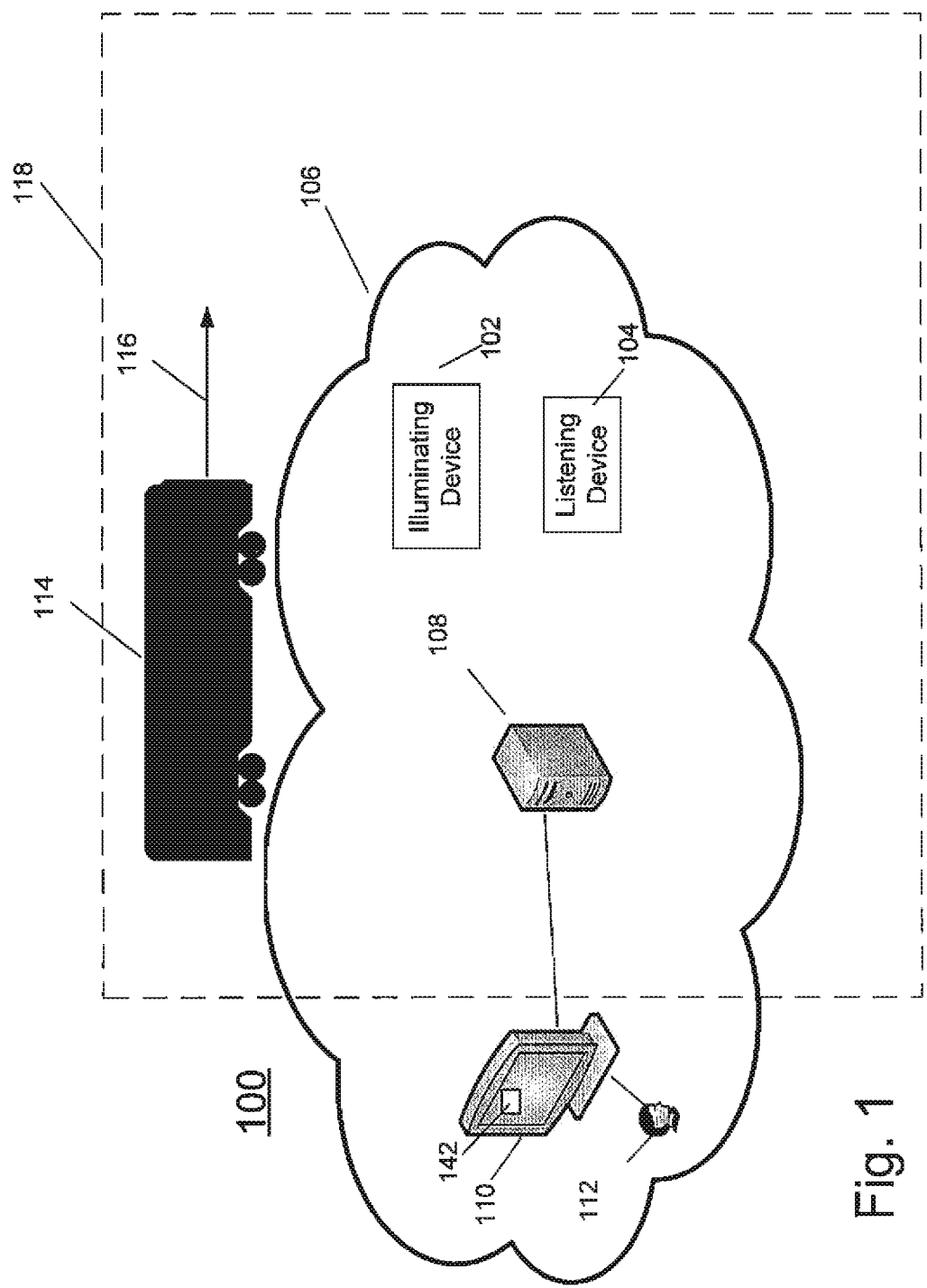
FIG. 1 illustrates some example systems that can be utilized to implement tracking of an object in augmented reality.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to tracking of an, object in augmented reality.

Briefly stated, technologies are generally described for tracking an object. In some examples, a system may comprise a mobile phone and an augmented reality device. The mobile phone may be effective to receive a transmitted wave and to receive a reflected wave reflected off of an object. The mobile phone may be configured to determine a difference between the transmitted and the reflected wave, and generate first tracking data based on the determined difference. The augmented reality device may be adapted to receive the first tracking data and determine second tracking data regarding the location of the object based on the first tracking data. An image may be generated on a display based on the determined first and second tracking data.

FIG. 1 illustrates some example systems that can be utilized to implement tracking of an object in augmented reality in accordance with at least some embodiments presented herein. In some examples, system 100 may include an illumination device 102, a listening device 104, a network 106, an augmented reality device 108, and a display 110. As is explained in more detail below, in some examples, illuminating device 102 may be adapted to illuminate an object 114 using electromagnetic waves. Object 114 may be moving in a direction 116. Listening device 104 may be adapted to receive electromagnetic waves produced by illuminating device 102 and to receive electromagnetic waves reflected off of object 114. Based on a difference between the electromagnetic waves received from illumination device 106 and the electromagnetic waves received from object 114, listening device 104 may be adapted to produce information regarding a location of object 114. That information may be sent through network 106 to augmented reality device 108. Device 108 may be adapted to use the information to generate an image 142 on display 110 for a user 112 regarding a scene of interest 118. The components of system 100 could all be disposed inside or outside of scene of interest 118.

Figure 2:
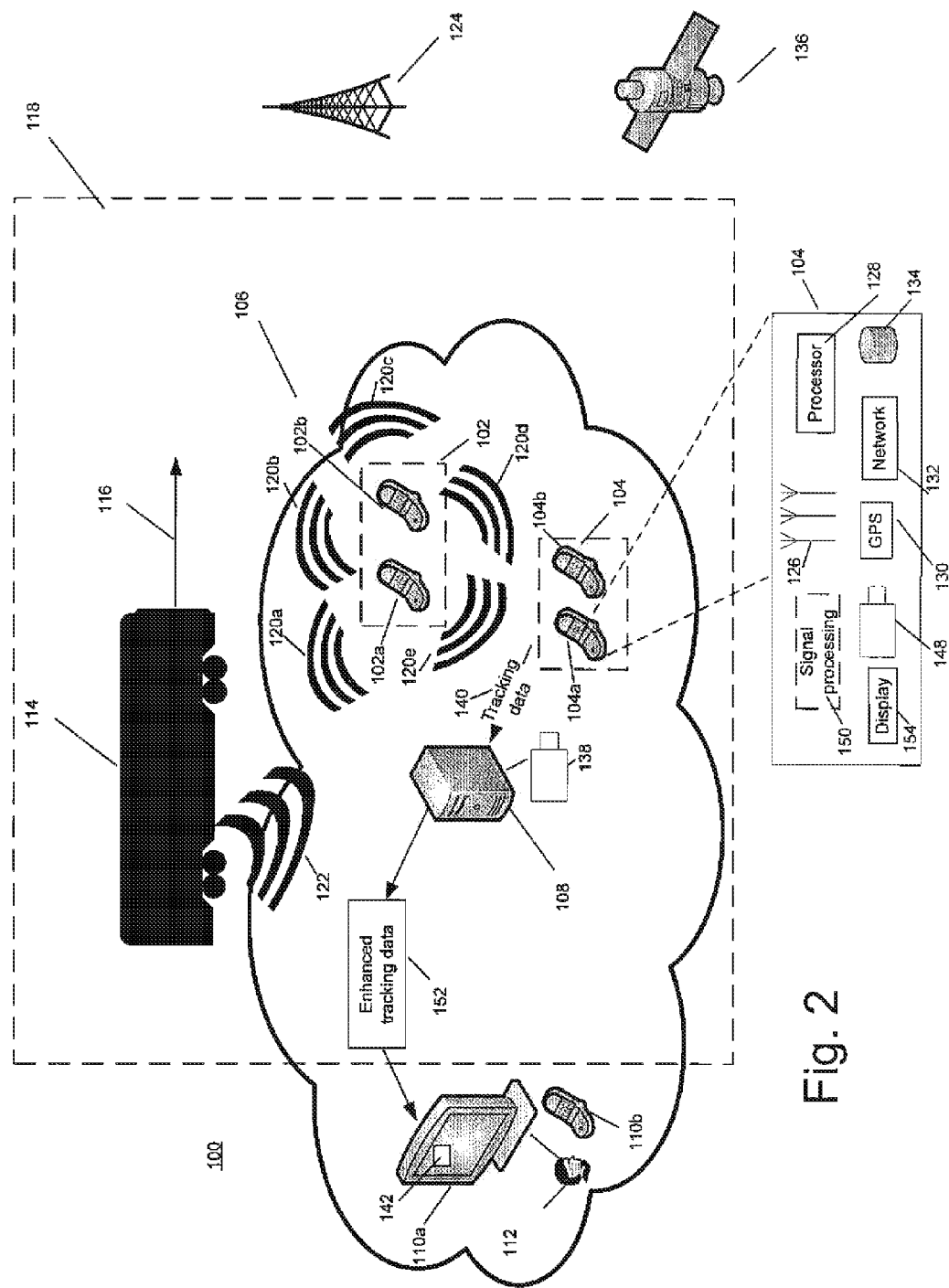
FIG. 2 illustrates some example systems that can be utilized to implement tracking of an object in augmented reality.

FIG. 2 illustrates some example systems that can be utilized to implement tracking of an object in augmented reality in accordance with at least some embodiments described herein. The system of FIG. 2 is substantially similar to system 100 of FIG. 1, with additional details. Those components in FIG. 2 that are labeled identically to components of FIG. 1 will not be described again for the purposes of clarity.

In addition to the components described above in FIG. 1, system 100 may further include a base station 124 and a GPS satellite constellation 136. As illustrated in FIG. 2, in some examples, illuminating devices 102 may include one or more mobile phones. In other examples, illuminating devices 102 may be any device that can be adapted to transmit electromagnetic waveforms. In some examples, illuminating devices 102 may include cellular communication sources, or radio frequency (RF) communication and/or broadcasting sources such as may be used for audio, television or some other data communication sources. In some examples, illuminating devices 102 may include TV (analog or digital) broadcast, Global System for Mobile (GSM) Communications, Code Division Multiple Access (CDMA) Communications, Wideband Code Division Multiple Access (WCDMA) Communications, Satellite Communications, Time Division Multiple Access (TDMA) Communications, Orthogonal Frequency-Division Multiple Access (OFDMA) Communications, Personal Handy-phone System (PHS) Communications, Amplitude Modulation (AM) or Frequency Modulation (FM) broadcasting, Digital Audio Broadcasting (DAB), Digital Video Broadcasting-Terrestrial (DVB-T), Wireless Local Area Network (WLAN) access points, Wide Area Network (WAN) access points, Metropolitan Area Network (MAN) access points, Personal Area Network (PAN) access points, etc. Similarly, in some examples, illuminating devices 102 may include a TV receiver, a digital TV receiver, a GSM device, a CDMA device, an AM/FM radio receiver, a PDA, a smart phone, a satellite radio receiver, a DAB receiver, a DVB-T receiver, a WLAN device, a WAN device, a MAN device, and a PAN device, etc.

Illuminating devices 102 may be adapted to transmit electromagnetic waves 120 such as when illuminating devices 102 communicate via an uplink communication channel with base station 124 of a cellular network. Electromagnetic waves 120 may be omni-directional and propagate in many directions. For simplicity, waves in five directions 120a, 120b, 120c, 120d, and 120e are shown. In some examples, waves 120a and 120b are incident upon object 114 moving in direction 116. Waves 120a and/or 120b, upon striking object 114, may reflect off of object 114. Moreover, as object 114 is moving in direction 116, waves 120a, 120b, reflecting off of object 114, may experience a frequency or Doppler shift as illustrated by wave 122.

Listening devices 104 may include one or more mobile phones or any device that may be used as an illuminating device as discussed above. Each listening phone 104 may include one or more of an antenna array 126, a global position system (GPS) module 130, a network module 132, a memory 134, a display 154, a sensing module 150 and a camera 148 that may all be in communication with a processor 128. GPS module 130 may be adapted to receive location information of device 104 from GPS satellite constellation 136. Antenna array 126 may be adapted to shape a direction and gain of electromagnetic detection used by listening phone 104 such as through the use of a beamforming algorithm discussed below. Network module 132 may be adapted to communicate information from device 104 to device 108 through network 106. Network module 132 and network 106 may be part of or include, for example, a Wi-Fi network, a packetized network, text messaging through short message service (SMS), Wireless Local Area Network (WLAN) Personal Area Network (PAN), Wide Area Network (WAN), Metropolitan Area Network (MAN) and other forms of communications, such as Bluetooth, Zigbee, WiMax, etc. Memory 134 may be adapted to store information used by listening phone 104. Camera 148 may be adapted to capture data regarding scene of interest 118.

In some examples, a single mobile phone may be used as both an illuminating device 102 and a listening device 104. For example, a single mobile phone may use a different set of frequencies for illuminating waves 120 and for listening for reflected waves 122. Other types of division multiplexing techniques may be used by a single mobile phone such as time division multiplexing, orthogonal frequency division multiplexing, etc.

In some examples, listening devices 104 may be linked to illuminating devices 102. For example, illuminating devices 102 may be adapted to send a control signal to inform device 108, or devices in network 106, that illuminating devices 102 plan to illuminate. Device 108 may be adapted to send a control signal requesting listening devices 104 to listen and/or requesting illuminating devices 102 to illuminate.

As discussed above with reference to FIG. 1, when wave 120 strikes moving object 114, reflected wave 122 may be produced. Antenna 126 of listening phone 104 may be adapted to receive reflected wave 122 and/or transmitted wave 120e. For example, waves 122 and 120e may be received by listening phone 104 through a direct channel and echo channel of listening phone 104. Processor 128 may be adapted to determine a difference between reflected wave 122 and transmitted wave 120. In some examples, the difference may be used to determine a Doppler Spectrum using cross-correlation processing as is discussed in more detail below. When the difference is above a threshold, processor 128 may be adapted to determine tracking data 140 about a location of object 114 as is explained in more detail below.

In some examples, the threshold may be determined based on a detection method used to detect whether there is a shift in the Doppler Spectrum. Different detection methods may result in different threshold. For example, if system 100 uses a Constant False Alarm Rate (CRAF) detection, the detection threshold can be computed so that the system maintains a constant pre-determined probability of false alarm.

Each listening device 104 may be adapted to determine its own location through, for example, GPS module 130 or through communication with base station 124. For example, each base station 124 may be adapted to communicate a respective GPS location of the base station to listening device 104. Processor 128 in listening device 104 may be adapted to approximate a distance between device 104 and each base station 124 and thereby triangulate a position of device 104. Processor 128 determines differences between wave 102 and wave 122. Processor 128 may be adapted to determine tracking data 140 about object 114 relative to listening device 104 using a beamforming algorithm. In some examples, the beamforming algorithm could be used to determine tracking data 140 such as an estimation of the location of object 114, variations in the Doppler spectrum caused by movement of object 114, an angle between object 114 and listening phone 104 and/or a change in the angle or velocity between object 114 and listening phone 104. The beamforming algorithm may be stored in memory 134 and could be, for example, a Kalman filter.

If phone 104 includes display 154, processor 128 may be adapted to use tracking data 140 to display an image of the object on display 154. Processor 128 may be adapted to combine tracking data 140 with data captured by camera 148, and/or display the combined information on display 154.

Processor 128 may be adapted to send tracking data 140, including a time and/or date stamp, to device 108 through network module 132 and network 106. Device 108 may be adapted to receive tracking data 140. Tracking data 140 may be received by device 108 from multiple listening phones 104. Tracking data 140 may be combined with other data about scene of interest 118, such as data captured from a camera 138 and/or data from camera 148, to produce image 142 of scene of interest 118 on display 110. Display 110 could be any form of a display such as a computer monitor 110a, a mobile phone 110b, or some other mobile device (not shown) and could be disposed inside or outside scene of interest 118. For example, listening phones 104 and/or illuminating phones 102 may be used for display 110.

Device 108 may be adapted to receive tracking data 140 from a multiple listening devices 104, and determine enhanced tracking data 152 of object 114. In some examples, tracking data 140 may be received from three listening devices. In these examples, each tracking data can indicate a location of the respective listening device and a distance between the object and the respective listening device. Device 108 can be adapted to triangulate a location of object 114. Device 108 may be adapted to send enhanced tracking data 152 to display 110. As discussed above, in some examples, display 110 may be listening or illuminating mobile phones 104 or 102. In some examples, if listening phone 104 includes display 154 corresponding to display 110b, processor 128 may be adapted to update display 154 based on enhanced tracking data 152.

In some examples, illuminating and listening devices 102 and 104 may be adapted to regularly send tracking data 140 to device 108. In addition to the data discussed above, tracking data 140 may include an identity of each device, a position of each device, and a mode being implemented such as illumination or listening. In some examples, device 108 can be external to devices 102 or 104 and communicate through network 106. In some examples, processes performed by device 108 may be software distributed in devices 102 and/or 104. In examples where the software is distributed among devices 102 and/or 104, the devices may be configured to communicate with each other using network 106.

After a moving object 114 is detected by listening device 104 and device 108, listening device 104 and device 108 can be adapted to track object 114. In some examples, device 108 can first determine which of devices 102 or 104 are available for tracking of object 114 in scene 118. In some examples, device 108 may be adapted to send a control signal to certain devices to request that those devices to be configured to illuminate or listen. For example, as shown in FIG. 2, device 108 may be adapted to send a control signal to configure devices 102 to illuminate and devices 104 to listen. For example, as object 114 moves to the right in the figure, the control signal may first request that device 102a should be adapted to illuminate and that device 102b should be adapted to listen. Thereafter, the control signal may request that device 102b be adapted to illuminate and device 104b be adapted to listen.

As discussed above, when object 114 moves relative to the illumination device, object 114 causes a variation in the Doppler spectrum. This variation may be detected by listening device 104 by measuring differences between wave 120 and wave 122. For example, listening device 104 may receive wave 120 and wave 122 on two distinct channels in antenna array 126. Processor 128 may be adapted to perform signal processing such as one or more of blind equalization, amplification, attenuation (e.g. gain scaling), down-conversion, demodulation, digitization (e.g. quantized by a comparator and/or analog-to-digital converter), data formatting, signal correction (e.g. orthogonal signal correction, multiplicative signal correction, etc.), bandwidth filtering (e.g. using passive or active filters such as band-pass, low-pass, high-pass filters, etc.), adaptive filtering, signal averaging, and/or data averaging on wave 120 and wave 122. In some examples, the above signal processing may be performed by processor 128 using a dedicated hardware module as shown at signal processing module 150. Processor 128 may be adapted to perform a coherent cross-correlation between wave 102 and wave 122 to determine a Doppler spectrum. Changes in the Doppler spectrum above a defined threshold may be utilized for at least a portion of tracking data 140.

Among other possible benefits, listening devices may be made portable, low cost and low power consuming. Additional frequency allocation for listening devices may be performed but may not be necessary. In some embodiments, listening devices may have a high counter-to-stealth capability because they may be passive devices. As passive devices, in some embodiments, do not actively send signals, tasks may be executed in a covert way. For example, listening devices may track moving objects without actively sending any types of signals. As a consequence, other devices may have difficulty detecting that the listening device is trying to perform tracking.

Existing mobile phones may be used as listening devices without modification to existing hardware. Adding heterogeneous sensors could add complexity from calibration and data fusion. As objects may be illuminated by mobile phones, a system that is arranged in accordance with the present disclosure can be easily organized. As mobile phones will tend to have different physical positions, mobile phones in the some described systems may include spatial diversity of scattering of objects. This may enable coverage of a broader area and the ability to track even weak scattered objects at long distances.

A system in accordance with the present disclosure can use a mobile phone to integrate tracked objects with information captured from a camera on the phone.

Figure 3:
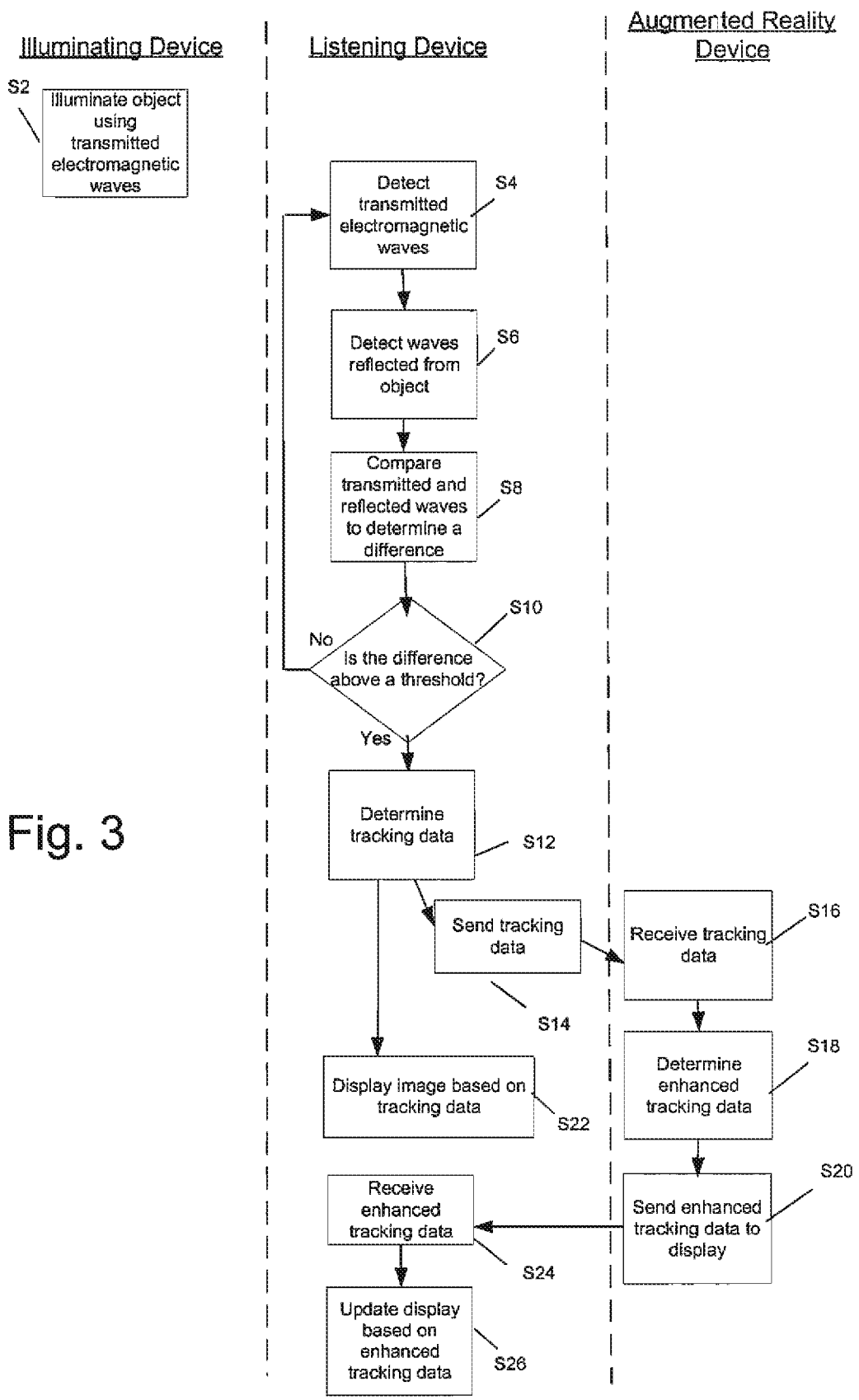
FIG. 3 depicts a flow diagram for example processes for tracking of an object in augmented reality.

FIG. 3 depicts a flow diagram for example processes for tracking of an object in augmented reality in accordance with at least some embodiments of the present disclosure. The process in FIG. 3 could be implemented using, for example, system 100 discussed above. An example process may include one or more operations, actions, or functions as illustrated by one or more of blocks S2, S4, S6, S8, S10, S12, S14, S16, S18, S20, S22, S24 and/or S26. Although illustrated as discrete blocks, various blocks may be divided into additional blocks, combined into fewer blocks, or eliminated, depending on the desired implementation. Processing may begin at block S2.

At block S2, an illuminating device such as a mobile phone can be adapted to illuminate an object using transmitted electromagnetic waves. The illumination may be performed, for example, by communicating with a base station. Block S2 can be followed by block S4.

At block S4, a listening device, such as a mobile phone, can be arranged to detect the transmitted electromagnetic waves. Processing may continue from block S4 to block S6.

At block S6, the listening device can be arranged to detect waves reflected from the object. Processing may continue from block S6 to block S8.

At block S8, the listening device can be adapted to compare the transmitted waves with the reflected waves to determine a difference. Processing may continue from block S8 to block S10.

At block S10, a query can be made by the listening device whether the difference is above a threshold. When the difference is determined to be below the threshold ("No") processing may continue from block S10 to block S4. Otherwise, when the difference is determined to be above the threshold, ("Yes"), processing may continue from block S10 to block S12.

At block S12, the listening device can be adapted to determine tracking data. Tracking data may include the information referenced above in tracking data 140. Processing may continue from block S12 to blocks S14 and S22.

At block S22, if the listening device includes a display, the listening device may be adapted to display information relating to the object based on the tracking data.

At block S14, the listening device may be adapted to send the tracking data to an augmented reality device. Processing may continue from block S14 to block S16.

At block S16, the augmented reality device can be arranged to receive tracking data received from a plurality of listening devices. Processing may continue from block S16 to block S18.

At block S18 the device may be adapted to determine enhanced tracking data regarding a location of the object. Processing may continue from block S18 to block S20.

At block S20, the augmented reality device may be configured to send the enhanced tracking data to a display. Processing may proceed from block S20 to block S24.

At block S24, if the listening device includes a display, the listening device can be adapted to receive the enhanced tracking data. Processing may continue from block S24 to S26.

At block S26, the listening device may be adapted to update a display based on the enhanced tracking data.

FIG. 4 illustrates computer program products 300 for tracking of an object in augmented reality in accordance with at least some examples of the present disclosure. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, one or more of processors in illuminating device 102, listening device 104 and/or device 108 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. in some implementations, signal bearing medium 302 may encompass a recordable medium 308, such as, but not limited to, memory, read/write (RAV) CDs, RJW DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 5 is a block diagram illustrating an example computing device 400 that is arranged to perform tracking of an object in augmented reality in accordance with at least some embodiments of the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a tracking of an object in augmented reality algorithm 426 that is arranged to perform the functions as described herein including those described previously with respect to FIGS. 1-4. Program data 424 may include object tracking data 428 that may be useful for a tracking of objects in augmented reality algorithm as is described herein. In some embodiments, application 422 may be arranged to operate with program data 424 on operating system 420 such that a tracking of objects in an augmented reality system may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the term's, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for using a mobile phone to track a location of a real object in a scene of interest for use in an augmented reality system, the method comprising:

receiving, through an antenna in the mobile phone, a transmitted wave;

receiving, through the antenna, a reflected wave, wherein the reflected wave is associated with energy reflected from the real object when the real object is illuminated with the transmitted wave;

determining a difference between the transmitted wave and the reflected wave by a processor in communication with the antenna, wherein the difference relates to a variation in a Doppler spectrum caused by movement of the real object with respect to the mobile phone;

generating tracking data by the processor based on the difference, the tracking data being associated with the location of the real object in the scene of interest with respect to the mobile phone; and combining the tracking data with additional data regarding the real object to generate combined data, wherein the combined data represents movement of the real object and represents the additional data within the augmented reality system.

2. The method as recited in claim 1, wherein the processor is a first processor and the method further comprises sending the tracking data over a network from the first processor to a second processor.

3. The method as recited in claim 2, wherein the mobile phone is a first mobile phone and the method further comprises generating the transmitted wave by the second mobile phone.

4. The method as recited in claim 3, further comprising sending a control signal from the second mobile phone to the first mobile phone, the control signal effective to request the first mobile phone to listen for the transmitted wave.

5. The method as recited in claim 3, wherein the method further comprises communicating by the second mobile phone with a base station; and wherein the second mobile phone is effective generate the transmitted wave when communicating with the base station.

6. The method as recited in claim 1, wherein the transmitted wave is generated by the mobile phone at a first time, the reflected wave is received by the mobile phone at a second time, the transmitted wave has a first spectrum including a first set of frequencies, and the reflected wave has a second spectrum including a second set of frequencies.

7. The method as recited in claim 1, wherein the tracking data includes a location of the processor.

8. The method as recited in claim 7, wherein the tracking data includes a distance between the processor and the real object.

9. The method as recited in claim 3, further comprising sending a control signal from the second processor to the second mobile phone, the control signal effective to request that the second mobile phone illuminate the real object.

10. The method as recited in claim 7, wherein the tracking data includes at least one of variations in the Doppler spectrum of the reflected wave with respect to the transmitted wave, an angle between the real object and the mobile phone, or a change in an angle between the real object and the mobile phone.

11. The method as recited in claim 1, wherein the tracking data is first tracking data and the method further comprises determining by the second processor second tracking data regarding the location of the real object, the second tracking data being based on at least two sets of first tracking data generated by the mobile phone and another mobile phone.

12. The method as recited in claim 1, further comprising:
capturing the additional data regarding the scene of interest by a camera in the mobile phone; and
displaying, by the mobile phone, an image based on the tracking data and the additional data regarding the scene of interest.

13. The method as recited in claim 11, further comprising:
capturing the additional data regarding the scene of interest by a camera in the mobile phone;
receiving the second tracking data by the mobile phone; and
displaying, by the mobile phone, an image based on the second tracking data and the additional data regarding the scene of interest.

14. The method as recited in claim 11, further comprising:
capturing the additional data regarding the scene of interest by a camera in communication with the second processor;
generating an image based on the second tracking data and the additional data regarding the scene of interest; and
sending the image to a display.

15. A mobile phone configured to track a location of a real object in a scene of interest for use in an augmented reality system, the mobile phone comprising:
a processor;
a memory arranged in communication with the processor;
an antenna arranged in communication with the processor, the antenna effective to communicate with a base station, the antenna effective to receive a transmitted wave and effective to receive a reflected wave, wherein the reflected wave is associated with energy reflected from the real object when illuminated with the transmitted wave;
wherein the processor is effective to
determine a difference between the transmitted wave and the reflected wave,
wherein the difference relates to a variation in a Doppler spectrum caused by movement of the real object with respect to the mobile phone;
generate tracking data based on the difference, the tracking data is associated with the location of the real object in the scene of interest with respect to the mobile phone;
combine the tracking data with additional data regarding the real object to generate combined data, wherein the combined data represents movement of the real object and represents the additional data within the augmented reality system; and
store the tracking data in the memory.

16. The mobile phone as recited in claim 15, further comprising a display arranged in communication with the processor, wherein the processor is effective to generate an image based on the tracking data, and wherein the display is effective to display the image.

17. The mobile phone as recited in claim 16, further comprising a camera arranged in communication with the processor, wherein the camera effective to capture the additional data regarding the scene of interest, and wherein the processor is configured to generate the image based on the tracking data and the additional data regarding the scene of interest.

18. An augmented reality device effective to track a location of a real object in a scene of interest in an augmented reality system using first tracking data received from a mobile phone, the first tracking data relating to a difference between a transmitted wave and a reflected wave, the reflected wave is associated with energy reflected from the real object when illuminated with the transmitted wave, the difference relates to a variation in a Doppler spectrum caused by movement of the real object with respect to the mobile phone, the augmented reality device comprising:
a processor;
a memory arranged in communication with the processor; and
an antenna arranged in communication with the processor, the antenna effective to receive the first tracking data, the first tracking data relating to a location of the real object in the scene of interest with respect to the augmented reality device, wherein the processor is configured to determine second tracking data regarding the location of the real object in the scene of interest with respect to the mobile phone based on the first tracking data, and the processor is configured to combine the first and second tracking data with additional data regarding the real object to generate combined data, wherein the combined data represents movement of the real object and represents the additional data within the augmented reality system.

19. The device as recited in claim 18, wherein the processor is effective to receive the first tracking data from a plurality of mobile phones.

20. The device as recited in claim 18, further comprising a display arranged in communication with the processor, wherein the processor is effective to generate an image based on the second tracking data, and wherein the display is effective to display the image.

21. A method for tracking a location of a real object in a scene of interest in an augmented reality system, the method for use in an augmented reality device, the method comprising:
receiving first tracking data at a processor from one or more mobile phones, the first tracking data relating to a difference between a transmitted wave and a reflected wave, the reflected wave is associated with energy reflected from the real object when illuminated with the transmitted wave, the difference relates to a variation in a Doppler spectrum caused by movement of the real object with respect to the one or more mobile phones, the first tracking data relating to the location of the real object in the scene of interest with respect to one of the mobile phones;
determining by the processor, second tracking data regarding the location of the real object based on the first tracking data; and
combining the first and second tracking data with additional data regarding the real object by the processor to generate combined tracking data, wherein the combined tracking data represents movement of the real object and represents the additional data within the augmented reality system.

22. The method as recited in claim 21, further comprising:
generating an image based on the second tracking data by the processor and
displaying the image on a display.

23. A system for tracking a location of a real object in a scene of interest for use in augmented reality, the system comprising:
a mobile phone, the mobile phone comprising:
a first processor,
a first antenna arranged in communication with the first processor, wherein the first antenna is effective to communicate with a base station, the first antenna effective to receive a transmitted wave and to receive a reflected wave reflected from the real object, wherein the reflected wave is associated with energy reflected from the real object when illuminated with the transmitted wave,
wherein the first processor is effective to determine a difference between the transmitted wave and the reflected wave, and effective to generate first tracking data based on the difference, the difference relates to a variation in a Doppler spectrum caused by movement of the real object with respect to the mobile phone, and the first tracking data is associated with the location of the real object in the scene of interest with respect to the mobile phone;
an augmented reality device, the augmented reality device comprising:
a second processor,
a second antenna arranged in communication with the second processor,
wherein the second antenna is effective to receive the first tracking data, the second processor is adapted to determine second tracking data regarding the location of the real object based on the first tracking data, and the second processor is adapted to combine the first and second tracking data with additional data regarding the real object to generate combined tracking data, wherein the combined tracking data represents movement of the real object and represents the additional data within the augmented reality.

24. The system as recited in claim 23, wherein the mobile phone is a first mobile phone, and the system further comprises a second mobile phone, wherein the second mobile phone is effective to generate the transmitted wave.

25. The system as recited in claim 24, wherein the second processor is effective to send a control signal to the second mobile phone, and the control signal is effective to request that the second mobile phone illuminate the real object.

26. The system as recited in claim 24, wherein:
the base station is a first base station;
the second mobile phone is further effective to communicate with a second base station; and
the second mobile phone is effective generate the transmitted wave when communicating with the second base station.

27. The system as recited in claim 23, wherein:
the transmitted wave is generated by the mobile phone at a first time with a first spectrum including a first set of frequencies; and
the mobile phone is effective to operate at a second time to receive the reflected wave with a second spectrum including a second set of frequencies.

28. The system as recited in claim 23, wherein the first tracking data includes a location of the first processor.

29. The system as recited in claim 23, wherein the first tracking data includes at least one of a distance between the first processor and the real object, variations in a Doppler spectrum associated with the reflected wave, an angle between the real object and the mobile phone, a change in an angle between the real object and the mobile phone, or a velocity of the real object.

30. The system as recited in claim 23, further comprising a display arranged in communication with the first processor, wherein the first processor is effective to generate an image based on the second tracking data, and wherein the display is effective to display the image.

31. The system as recited in claim 30, further comprising a camera arranged in communication with the first processor, wherein the camera effective to capture data regarding a scene of interest, and wherein the first processor is effective to generate the image based on the second tracking data and the data regarding the scene of interest.

32. A non-transitory computer storage medium having computer-executable instructions stored thereon which, when executed by a mobile phone, adapt the mobile phone to perform a method for tracking a location of a real object in a scene of interest for use in an augmented reality system, the method comprising:
receiving, through an antenna in the mobile phone, a transmitted wave;
receiving, through the antenna, a reflected wave, wherein the reflected wave is associated with energy reflected from the real object when illuminated with the transmitted wave;
determining a difference between the transmitted wave and the reflected wave by a processor in communication with the antenna, wherein the difference relates to a variation in a Doppler spectrum caused by movement of the real object with respect to the mobile phone;

generating tracking data by the processor based on the difference, the tracking data being associated with the location of the real object in the scene of interest with respect to the mobile phone; and combining the tracking data with additional data regarding the real object to generate combined data, wherein the combined data represents movement of the real object and represents the additional data within the augmented reality system.

33. A system for tracking a location of a real object in a scene of interest for use in augmented reality, the system comprising:

a first mobile phone, the first mobile phone comprising:
a first processor,
a first antenna arranged in communication with the first processor, wherein the first antenna is effective to communicate with a first base station, the first antenna effective to receive a first transmitted wave and to receive a first reflected wave reflected from the real object, wherein the first reflected wave is associated with first energy reflected from the real object when illuminated with the first transmitted wave,
wherein the first processor is effective to determine a first difference between the first transmitted wave and the first reflected wave, and effective to generate first tracking data based on the first difference, wherein the first difference relates to a variation in a Doppler spectrum caused by movement of the real object with respect to the first mobile phone, the first tracking data is associated with the location of the real object in the scene of interest with respect to the first mobile phone;

a second mobile phone, the second mobile phone comprising:
a second processor,
a second antenna arranged in communication with the second processor, wherein the second antenna is effective to communicate with a second base station, the second antenna effective to receive a second transmitted wave and to receive a second reflected wave reflected from the real object, wherein the second reflected wave is associated with second energy reflected from the real object when illuminated with the second transmitted wave,
wherein the second processor is effective to determine a second difference between the second transmitted wave and the second reflected wave, and effective to generate second tracking data based on the second difference, wherein the second difference relates to a variation in the Doppler spectrum caused by movement of the real object with respect to the second mobile phone, the second tracking data is associated with the location of the real object in the scene of interest with respect to the second mobile phone;

an augmented reality device, the augmented reality device comprising:
a third processor,
a third antenna arranged in communication with the third processor,
wherein the third antenna is effective to receive the first and second tracking data, the third processor is adapted to determine third tracking data regarding the location of the real object based on the first and second tracking data and the third processor is adapted to combine the first, second and third tracking data with additional data regarding the real object to generate combined tracking data, wherein the combined tracking data represents movement of the real object and represents the additional data within the augmented reality.

34. The system as recited in claim 33, further comprising a third mobile phone, wherein the third mobile phone is effective to generate the first transmitted wave.

* * * * *

UNITED STATES PATENT AND TRADEMARK OFFICE
CERTIFICATE OF CORRECTION

PATENT NO. : 8,442,502 B2  
APPLICATION NO. : 12/715868  
DATED : May 14, 2013  
INVENTOR(S) : Leung Page 1 of 2

It is certified that error appears in the above-identified patent and that said Letters Patent is hereby corrected as shown below:

In the Drawings:

In Fig. 5, Sheet 5 of 5, below "PROCESSOR (404)", Line 1, delete "UP/UC / DSP" and insert -- µP/µC/DSP --, therefor.

In the Specification:

In Column 1, Line 61, delete "an," and insert -- an --, therefor.

In Column 2, Line 21, delete "illumination device 106" and insert -- illumination device 102 --, therefor.

In Column 4, Line 5, delete "(CRAF)" and insert -- (CFAR) --, therefor.

In Column 4, Line 16, delete "wave 102" and insert -- wave 120 --, therefor.

In Column 5, Line 42, delete "wave 102" and insert -- wave 120 --, therefor.

In Column 7, Line 11, delete "in some" and insert -- In some --, therefor.

In Column 7, Line 14, delete "(RAV) CDs, RJW" and insert -- (R/W) CDs, R/W --, therefor.

In Column 7, Line 43, delete "thereof" and insert -- thereof. --, therefor.

In Column 9, Line 61, delete "C'"" and insert -- C" --, therefor.

In Column 9, Line 67, delete "(e.g,"" and insert -- (e.g., " --, therefor.

Signed and Sealed this  
Twenty-second Day of October, 2013

Teresa Stanek Rea  
*Deputy Director of the United States Patent and Trademark Office*

In Column 10, Line 1, delete "C''" and insert -- C" --, therefor.

In Column 10, Line 8, delete "term's," and insert -- terms, --, therefor.

In the Claims:

In Column 11, Line 17, in Claim 5, delete "effective generate" and insert -- effective to generate --, therefor.

In Column 14, Line 21, in Claim 26, delete "effective generate" and insert -- effective to generate --, therefor.